(12) United States Patent
Taylor

(10) Patent No.: US 7,224,242 B2
(45) Date of Patent: May 29, 2007

(54) MICROWAVE FILTER ASSEMBLY

(75) Inventor: Richard Taylor, Queensland (AU)

(73) Assignee: Micorwave and Materials Designs IP Pty Ltd., Paddington, Queensland (AU)

( * ) Notice: Subject to any disclaimer, the term of this patent is extended or adjusted under 35 U.S.C. 154(b) by 91 days.

(21) Appl. No.: 10/513,741

(22) PCT Filed: May 7, 2003

(86) PCT No.: PCT/AU03/00541

§ 371 (c)(1),
(2), (4) Date: Mar. 1, 2005

(87) PCT Pub. No.: WO03/096473

PCT Pub. Date: Nov. 20, 2003

(65) Prior Publication Data
US 2005/0176387 A1    Aug. 11, 2005

(30) Foreign Application Priority Data
May 7, 2002    (AU) .................................... PS2167

(51) Int. Cl.
*H01P 1/203*    (2006.01)
(52) U.S. Cl. .................... 333/99 S; 505/210; 505/875; 505/885
(58) Field of Classification Search ............. 333/99 S; 505/210, 875, 878, 885
See application file for complete search history.

(56) References Cited

U.S. PATENT DOCUMENTS

| | | | |
|---|---|---|---|
| 3,906,412 A | 9/1975 | Meyerhoff et al. | |
| 5,188,776 A * | 2/1993 | Witzke et al. | 264/29.2 |
| 5,555,914 A * | 9/1996 | Baker et al. | 138/115 |
| 5,724,012 A | 3/1998 | Teunisse et al. | |
| 5,935,910 A * | 8/1999 | Das | 505/210 |
| 6,111,485 A | 8/2000 | Carlsson et al. | |
| 6,208,227 B1 | 3/2001 | Remillard et al. | |
| 6,212,404 B1 | 4/2001 | Hershtig | |
| 6,263,215 B1 | 7/2001 | Patton et al. | |

FOREIGN PATENT DOCUMENTS

| | | |
|---|---|---|
| DE | 3616548 A1 | 11/1987 |
| JP | 63250020 | * 10/1998 |
| JP | 2002134800 | * 5/2002 |

OTHER PUBLICATIONS

A Practical Microwave Subsystem of HTS Filter Integrated with Coaxial Pulse Tube Refrigerator—2000.
HTS Filter Subsystems for Wireless Telecommunications—2001.
Development of Space Qualifiable HTS Communication Subsystems—2001.

* cited by examiner

Primary Examiner—Robert Pascal
Assistant Examiner—Kimberly E Glenn
(74) Attorney, Agent, or Firm—Fulwider Patton LLP

(57) ABSTRACT

A filter element (28) having planar (48) or cavity (30) geometry having applied thereto a coating (38, 39, 50, 53) of temperature super conducting (HTS) material in which the filter element (28) or coating of HTS material is provided with a porous structure (49A) or has associated therewith a plurality of cooling passages (29, 40, 42, 55) for passage of refrigerant when the filter element (28) is connected to a refrigeration circuit. A refrigeration circuit includes a compressor (18) connected to a heat exchanger assembly (19) located in an evacuated housing (20), wherein the heat exchanger assembly (19) includes an influent line (22), a first heat exchanger unit (21) in communication with the influent line (22), a throttle valve (23) which is in communication with the filter (28), a second heat exchanger unit (25) in communication with the filter (28) and a return line (26) to the compressor (18).

24 Claims, 6 Drawing Sheets

Section A-A

Section B-B

MICROWAVE FILTER ASSEMBLY

RELATED APPLICATIONS

This is a U.S. national phase of PCT/AU03/00541 filed 7 May 2003, claiming priorty from Australian PS 2167 filed 7 May 2002.

FIELD OF THE INVENTION

THIS INVENTION relates to a filter assembly for use in cryogenic applications where the filter assembly, in a preferred embodiment, may operate at a temperature of 77° Kelvin or greater. The filter assembly may be used in wireless communications as an RF or microwave filter assembly.

BACKGROUND ART

A cryogenic filter assembly is described in U.S. Pat. No. 6,212,404. This reference broadly refers to a wireless communication system comprising a tower having one or more antennas coupled to a module which includes a bandpass wave guide cavity filter and a low noise amplifier, which module is connected to receiver circuitry via one or more co-axial cables. The cavity filter is shown coupled to cryogenic cooling apparatus comprising a heat exchange unit and a cooling generation unit. U.S. Pat. No. 6,212,404 also discloses retro-fitting of conventional rural antenna configurations comprising a tower having one or more antennas and connected to an RX filter and low noise amplifier as well as a TX filter wherein cryogenic cooling apparatus is fitted to the RX filter and/or the low noise amplifier. The use of the cryogenic cooling apparatus is stated to substantially increase the sensitivity of the wireless communication system and to substantially decrease the noise factor. The cryogenic cooling system disclosed in U.S. Pat. No. 6,212,404 comprises a compressor coupled to a heat exchange unit for continuous circulation of a gaseous refrigerant fluid between the compressor and the heat exchange unit. Thus, cooled and compressed fluid is passed into the heat exchange unit through a high pressure line and warm expanded fluid is returned to the compressor from the heat exchange unit through a low pressure line. The heat exchange unit is located in an evacuated chamber which also houses the wave guide cavity filter which is in direct contact with a cooling finger of the heat exchange unit. Thus, in this arrangement, the wave guide cavity filter is in direct contact with the cold head of the cryogenic cooling apparatus and this has resultant disadvantages of providing an unduly complicated refrigeration circuit insofar as structure is concerned with a subsequent loss of operating efficiency.

It is noted, however, that U.S. Pat. No. 6,212,404 only discloses a wave guide cavity filter such as that disclosed in U.S. Pat. No. 5,936,490 and it disclaims the use of filters formed from high temperature super conducting (HTS) materials. Such HTS materials provide an advantage of constructing resonators with very large unloaded Q factor.

OBJECT OF THE INVENTION

It is therefore an object of the invention to provide a microwave filter assembly which reduces the disadvantages of the aforementioned prior art.

SUMMARY OF THE INVENTION

The microwave filter of the assembly includes a filter element having a planar or cavity geometry having applied thereto a coating of high temperature superconducting (HTS) material characterized in that said filter element or said layer of HTS material is provided with a porous structure or has associated therewith a plurality of cooling passages for passage of refrigerant when said filter element is connected to a refrigeration circuit.

The filter element may have a planar geometry and therefore may preferably comprise one or more plates or layers of a dieletric substrate. Such plates or layers may have a thickness of 0.3 mm-2.0 mm. Suitably, the coating of HTS material may be applied thereto in any suitable manner and, thus, be transmission lines in the form of ribs or strips which may be applied to one broad surface of the dielectric plate(s) or layer(s) and, if necessary, to opposed broad surface(s) of the dielectric plate(s).

The HTS material which functions as a conductor or active element may be applied to the dielectric substrate(s) to form transmission lines in the nature of a stripline, microstrip line or slotline as described in a publication entitled "Stripline-like Transmission Lines for Microwave Integrated Circuits" by Bhat and Koul, Wiley Eastern Limited (1989), which publication is incorporated herein by reference. Thus, variants of stripline, microstrip line and slotline entitled suspended stripline, suspended microstrip, inverted microstrip coplanar waveguide and coplanar strips are also proposed in this publication. As described in this publication, there may be continuous layers of HTS material applied to the dielectric substrate in the form of one or more ground planes.

It will be appreciated that the HTS material may be applied to the dielectric substrate(s) to form resonant structures of any suitable shape such as circles, rectangles, polygons and the like interconnected by the transmission lines.

The filter element may also have a cavity geometry for use in the invention and, thus, may comprise a waveguide cavity filter as described in U.S. Pat. No. 6,212,404. Suitable types of waveguide cavity filters are also described in U.S. Pat. No. 5,936,490. Basically, a cavity filter includes a body which has a large hollow interior, such as a hollow tube or waveguide, comprising walls of minimal thickness, ie. of the order of 0.01 to 5.0 mm. The dielectric medium or insulator with cavity type filters is air. The hollow body may be provided with one or more partitions having apertures or passages which form resonant structures. Alternatively, a resonant structure in the form of a dielectric resonator may be formed coaxially within the tube, which may be of any suitable cross-sectional shape. Alternatively, a cavity type filter may be formed from a large solid block having passages or apertures machined or drilled out of the solid block. In accordance with the invention, conducting layers formed from HTS material are applied to the hollow interior of the cavity filter.

The substrate for the deposition of HTS materials, as described above, may comprise any suitable material for application of HTS material, such as $MgO$, $Al_2O_3$, $La\ AlO_3$, $La\ Sr\ AlO_4$, $Si$, $(La\ Sr)\ (Al\ Ta)\ O_3$, Y-stabilized zirconia, $YBa_2\ Nb\ O_6$, $Nd\ Ba_2\ Nb\ O_6$, $Ba\ Zr\ O_3$, $GdBa_2\ HfO_{5.5}$, $(Pr, Sm, Gd)\ Ba_2\ Sb\ O_6$, $YBa_2\ Sn\ O_{5.5}$, $Pr\ Ba_2\ Nb\ O_6$, $Sm\ Ba_2\ Nb\ O_6$ and $Eu\ Ba_2\ Nb\ O_6$. However, yttrium stabilized zirconia (YSZ) is preferred for most applications of the above substrates. $MgO$, $La\ AlO_3$, $Al_2O_3$, $La\ Sr\ AlO_4$, $Si$, and $(La\ Sr)\ (Al\ Ta)\ O_3$, are more suitable for thin film deposition while the remainder of the substrates discussed above are more suitable for thick film deposition. Thin films usually have a thickness of 0.5 to 2 microns while thick films have a thickness of 10 to 100 microns.

The choice of HTS material may be selected from YBa$_2$ Cu$_3$ Ox (YBCO) Tl$_2$ Ba$_2$ Ca$_2$ Cu$_3$ Ox (TBCCO 2223), Tl$_2$ Ba$_2$ Ca$_1$ Cu$_2$ Ox (TBCCO 2212), and Biz (Pb) Sr$_2$ Ca$_2$ Cu$_3$ Ox (BSCCO 2223). Of these materials, YBCO has been used most widely in applications. These materials are suitable for thick films, which are sometimes preferred to thin films because of their low cost, their ability to be applied to curved surfaces and the ability to be produced on very large, flat polycrystalline substrates.

The methods of coating a suitable substrate for HTS films as described above may comprise evaporation, laser ablation, metal-organic chemical vapour deposition (MOVCD) sputtering and liquid phase epitaxy as described in "Microwave Superconductivity" edited by Weinstock and Nisenoff Proceedings of the NATO Advanced Study Institute on Microwave Superconductivity at Millau France (1999). The publication is published by Kluwer Academic Publishers Dordrecht, The Netherlands in 2001. This publication is incorporated herein by reference. Basically, evaporation involves evaporating the HTS material onto a heated substrate in the presence of oxygen. Usually, the substrate is mounted on a rotating holder that passes alternately into a region where the HTS materials are evaporated then into a region of high oxygen pressure. A large pressure differential is maintained between the two regions.

Pulsed laser ablation involves using a UV laser which is pulsed through a chamber containing oxygen gas forming a visible plume which contacts the hot substrate which often rotates with respect to the plume.

In MOVCD, metal cations are transported as volatile organic compounds which decompose to deposit the HTS materials on a hot substrate which is then oxidized.

Sputtering involves using a plasma generated by either a DC or RF discharge, wherein ions in the plasma strike a stoichiometric ceramic target and atoms are sputtered off to be deposited on a hot substrate. The discharge is usually confirmed and stabilized by a magnetic field.

Liquid Phase Epitaxy (LPE) involves a process, wherein a substrate is immersed in an off stoichiometric melt, like those used to grow single crystals, and growth is induced by small temperature changes or gradients. The films grow with low oxygen content and must be oxygenated by annealing.

In accordance with a preferred embodiment of the invention, capillary passages having a diameter of 20 microns to 5 mm may be formed in the substrate to which the HTS material is applied. Alternatively, nanotube capillaries may be used as discussed hereinafter. Thus, when the substrate is in the form of the dielectric plate(s) of the planar filter, nanotube capillaries may be used. Alternatively, when the substrate is the tube or block forming the cavity, filter capillaries, as discussed above, may be used. In either situation, a continuous flow of refrigerant passes through the capillary passages in contact with HTS layers or ribs forming active layers or functional components of the filter. Alternatively, the substrate may be of a permeable material and the refrigerant passes through the interstices of the permeable material.

Alternatively, serpentine tubing formed from copper or other suitable conducting material having a diameter of 20 microns to 5 mm may be applied to an adjacent layer of substrate by application of suitable adhesive before application of HTS material by any one of the coating techniques discussed above.

DETAILED DESCRIPTION OF THE DRAWINGS

Figure 1:
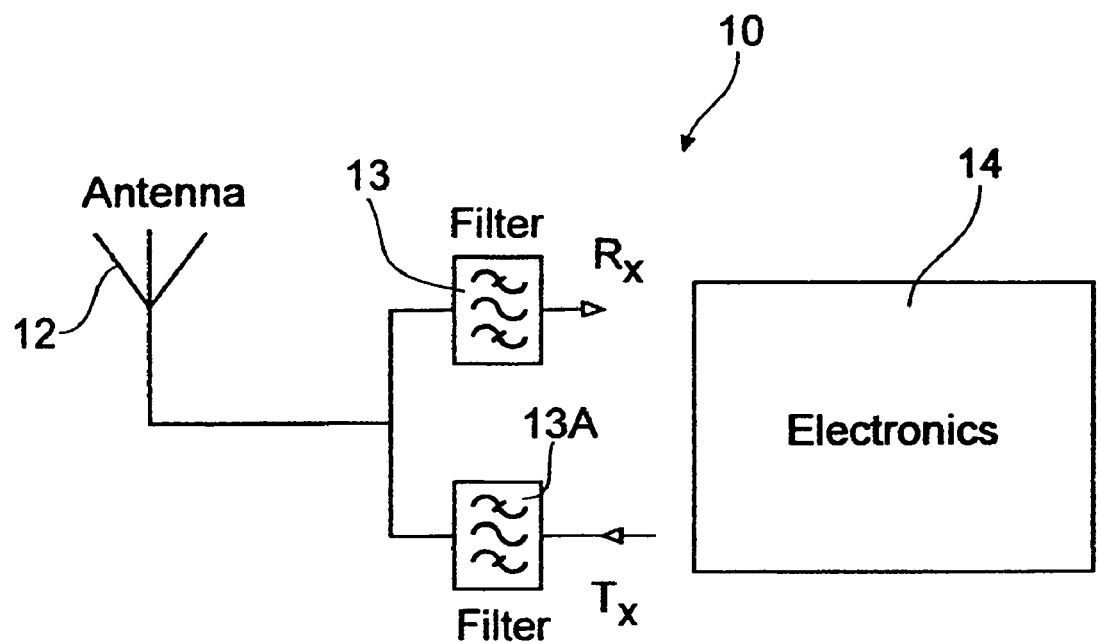
FIG. 1 is a schematic drawing of a wireless communication system, which may utilize the filter of the invention.

FIG. 1 shows an example of a wireless communication system 10 comprising an antenna 12, filters 13 and 13A, a receive line (RX) and a transmission line (TX) coupled to electronics circuitry 14. Filters 13 and 13A are constructed in accordance with the invention and are widely used in system 10 to discriminate between wanted and unwanted signal frequencies. Filters are two-port networks used to control the frequency response in an RF or microwave system by allowing transmissions within the passband of the filter, and attenuation within the stopband of the filter. Common filter responses include low-pass, high-pass, band-pass and bandstop or bandreject.

Figure 2:
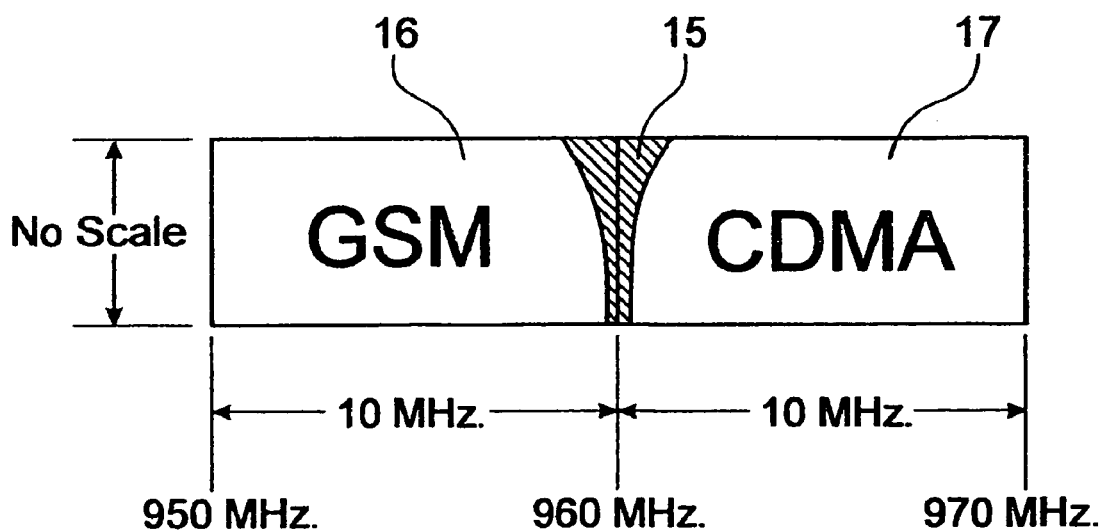
FIG. 2 is a schematic drawing of the particular frequency range to which the filters of the invention may be used.

The objective of filters constructed in accordance with the invention is to increase the performance of filters so as to be able to effectively utilize frequencies in the guard band or interference band 15, which is presently unable to be used between the GSM (Group Special Mobile) 16 and CDMA (Code Division Multiple Access) 17 shown schematically in FIG. 2. Relevant frequencies are also shown in FIG. 2 by way of example.

Figure 3:
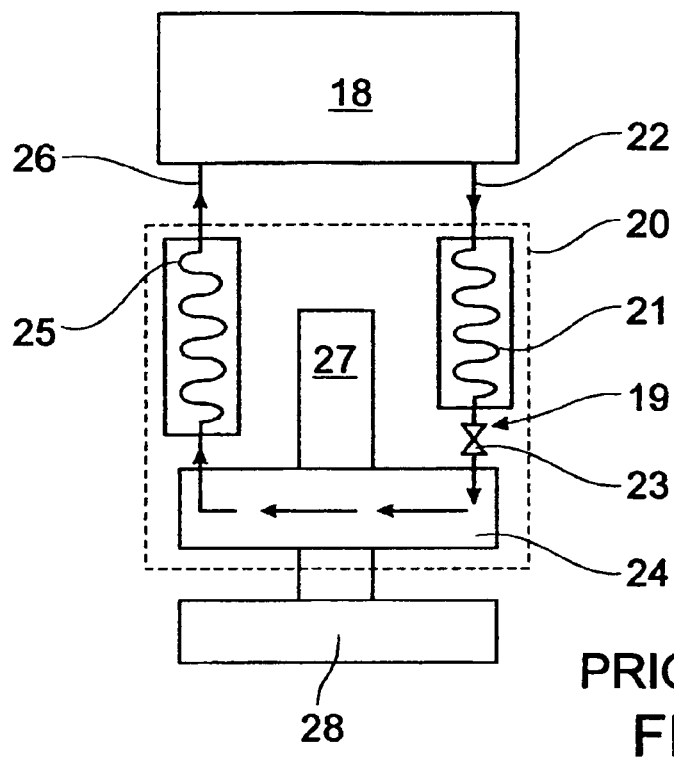
FIG. 3 is a schematic drawing of a conventional refrigeration circuit, which utilizes a microwave filter.

Reference is made to a prior art refrigeration circuit in FIG. 3, wherein a compressor 18 is connected to a coldhead or heat exchanger assembly 19, which is located in an evacuated housing or Dewar 20. Compressor 18 may preferably in the form of a linear compressor which may comprise a conventional pair of pistons which may be driven to compress refrigerant which passes into the compressor by a linear motor. The heat exchanger assembly comprises a heat exchanger unit 21 which communicates with an influent or forward line 22, throttle valve 23, expansion chamber 24, heat exchanger unit 25, return line 26 and cold finger 27. Both heat exchanger units 21 and 25 also alternatively known as "cold fingers" may also have an expansion space for expansion of fluid and a compression space for compression of fluid. Cold finger 27 is shown in contact with microwave filter 28, which may be of the planar or cavity type or, alternatively, the coldhead 19 may be spaced from the filter 28. A variation of this schematic layout is shown in U.S. Pat. No. 6,212,404. Refrigerant in the form of a gaseous inert gas, such as nitrogen, argon, krypton or helium travels in the circuit shown in FIG. 3 through lines 22 and 26 to increase the efficiency of operation of filter 28 as described in U.S. Pat. No. 6,212,404.

Figure 4:
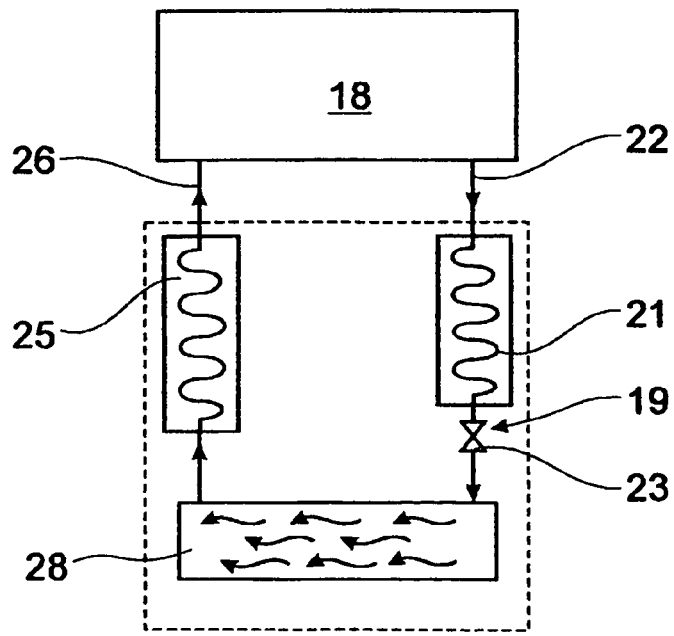
FIG. 4 is a schematic drawing of the refrigeration circuit of the invention.

In FIG. 4, a similar refrigeration circuit is shown with the exception that influent is caused to flow through filter 28 rather than adjacent to it as shown in FIG. 3. This is shown by the arrows in full outline within the confines of filter 28 shown in FIG. 4.

Figure 5:
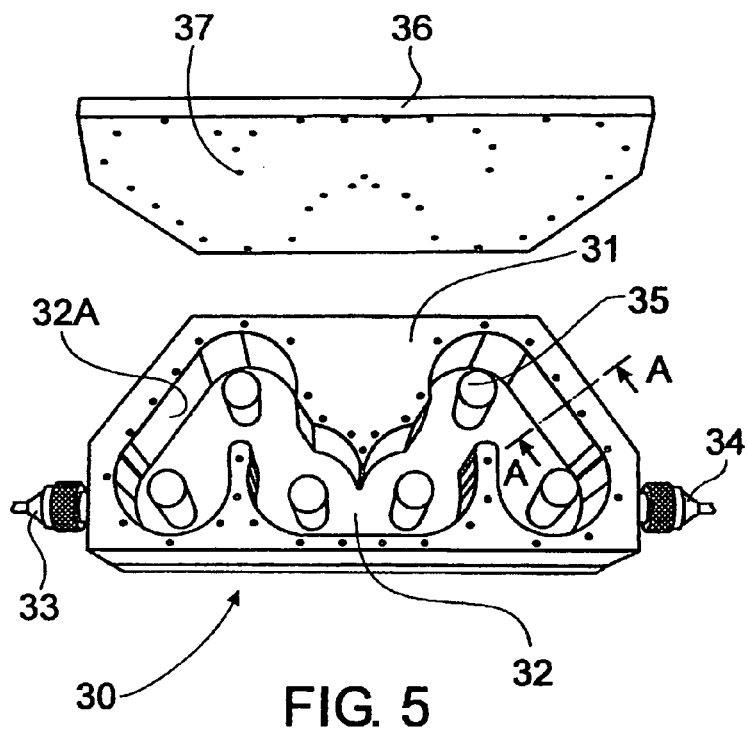
FIG. 5 shows a perspective view of a cavity type fitter of the invention.
Figure 5A:
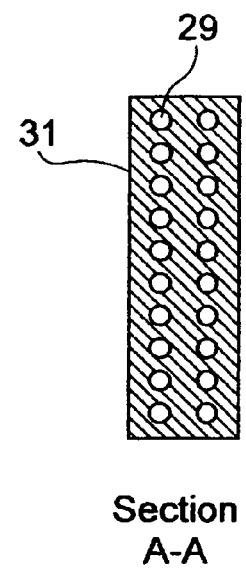
FIG. 5A is a cross section through line A—A of FIG. 5.

FIG. 5 shows a cavity type filter 30 having a hollow body or block 31 which is provided with a hollow interior 32 having an input 33 and output 34. There are also provided resonant structures in the form of cylindrical pins 35 in the form of dielectric resonators. There is also shown a cover or lid 36 adapted to be attached to body 31 by use of fasteners (not shown) through mating attachment apertures 37. A layer of HTS material is omitted from FIG. 5 for convenience, but shown in FIG. 6. FIG. 5A shows a cross section through line A—A, which is of rectangular shape as indicated. FIG. 5A also shows internal conduits 29, which correspond to the capillary passages described above which may be formed by machining, drilling or other operation to hollow body 31.

Figure 6:
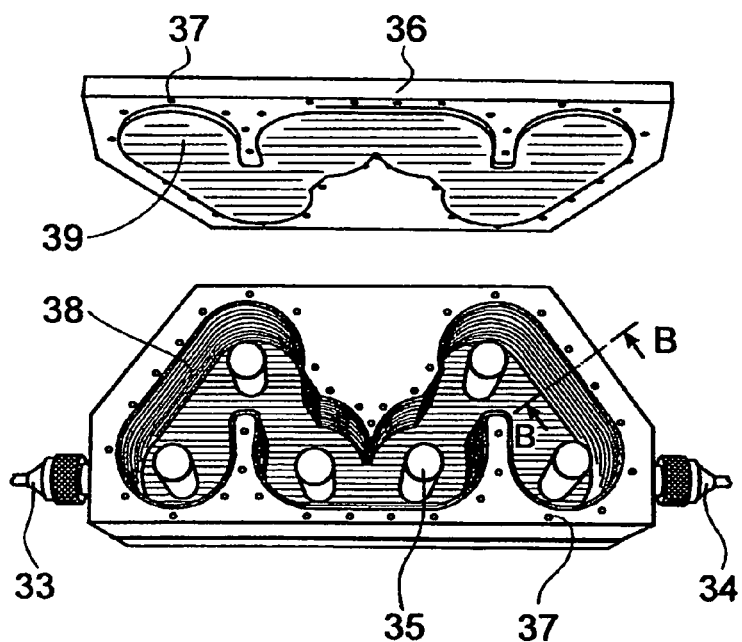
FIG. 6 is a perspective view of the cavity type filter of FIG. 5 having a coating of HTS material.
Figure 6A:
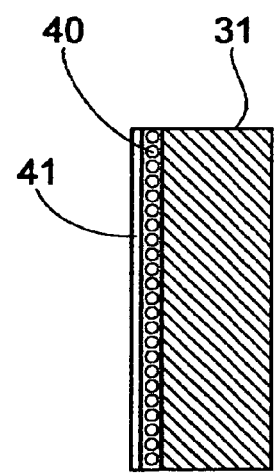
FIG. 6A is a section through line A—A of FIG. 6.

In accordance with the invention, FIG. 6 shows application of HTS material to body 31 in the form of a coating or layer 38. The HTS material is also applied to the underside of cover 36 in the form of coating or layer 39. The layers 38 and 39 also are provided with a plurality of hollow conduits in the form of capillary passages 40 shown in FIG. 6A in sectional drawing B—B. There is also provided a peripheral layer 41 of HTS material.

Figure 7:
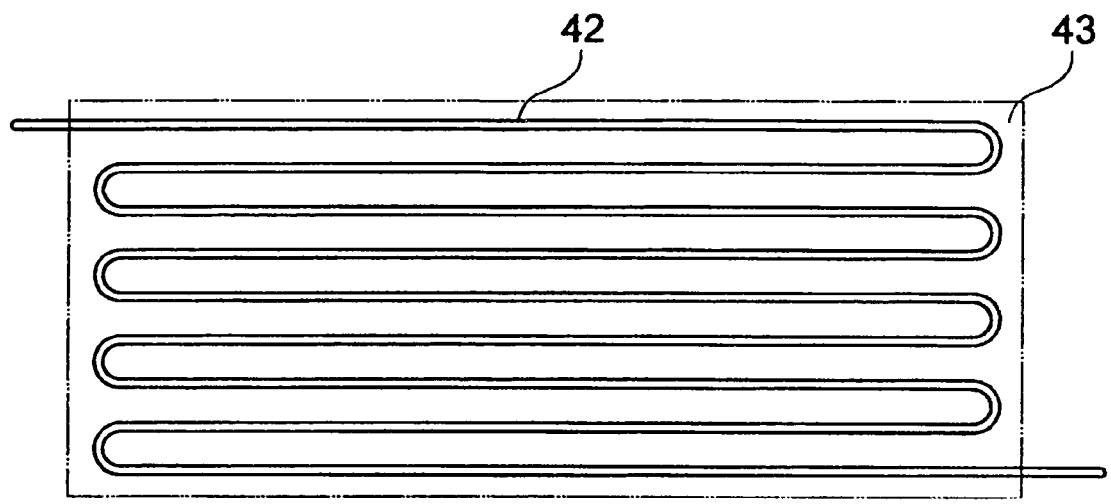
FIG. 7 shows one method of forming a serpentine arrangement of capillary passages within the layer of HTS material.
Figure 9:
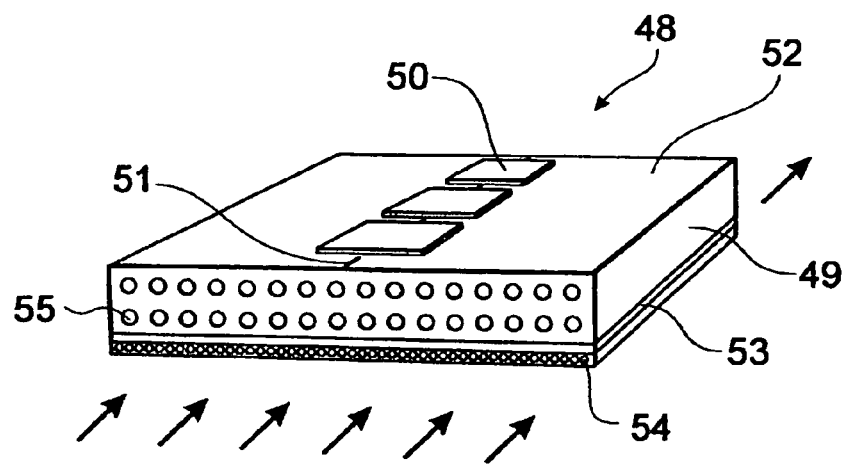
FIG. 9 shows a planar filter of the invention.
Figure 10:
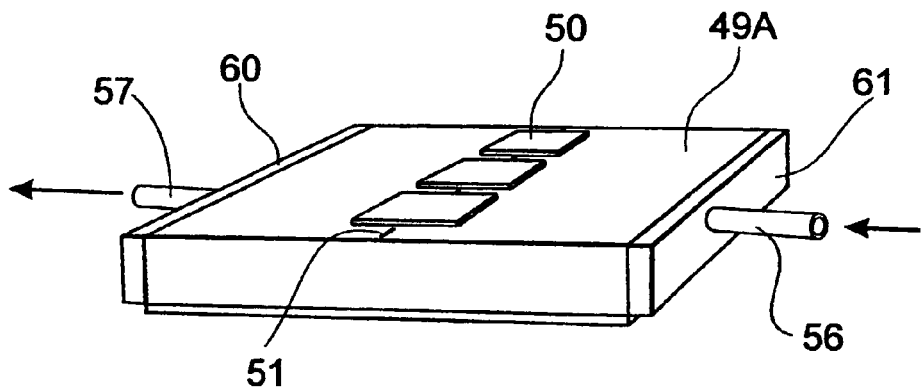
FIG. 10 shows another embodiment of a planar filter of the invention.

FIG. 7 shows that one method of forming capillary passages 40 in layers 38 and 39 is by the application of capillary tubing 42, which may be bonded to an adjacent surface 43 of filter 30 or planar filter 48 shown in FIGS. 9 to 10. The capillary tubing 42 may be bonded to surface 43 by an epoxy-based resin, for example. The capillary tubing 42 may also be in the form of nanotubes, which may be formed from boron nitride or carbon. Such nanotubes may be 10–20 nm thick and have a diameter of about 1.4 nm as described, for example, in an article by Yakobson and Smalley entitled "Fullerene Nanotubes: C1,000,000 and Beyond" in American Scientist, 85, 324–337 (1997), which is incorporated herein by reference. Carbon nanotubes having diameters of 0.9–2.8 nm have also been reported in Physics News, 531, Mar. 22, 2001 by Schewe, Stein and Riordan. Reference also may be made to U.S. Pat. Nos. 6,190,634, 6,083,624, 5,997,832, 5,985,446, 5,951,832, 5,919,429, 5,716,708 and 5,627,140 which also describe processes for production of nanotube structures that may be utilized in the present invention.

Figure 8:
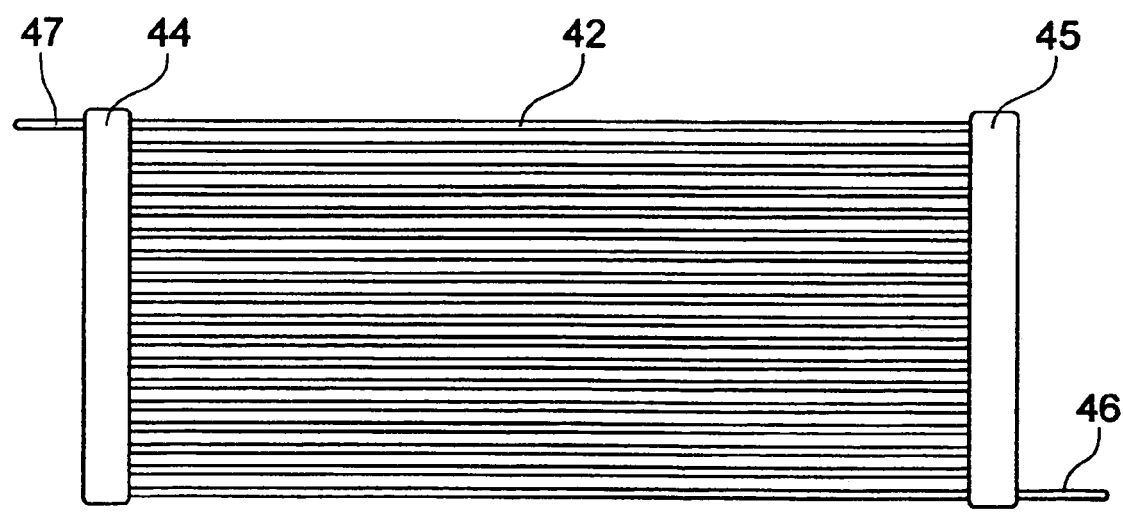
FIG. 8 shows an arrangement of capillary tubing connected to end manifolds.

FIG. 8 shows the inclusion of manifolds 44 and 45 and inlet 46 and outlet 47 of an arrangement of capillary tubing 42, which may be attached to surface 43. In the case of cavity filter 30, capillary tubing 42 may be adapted to have a shape that conforms to the hollow interior 32 and, thus, conforms to the shape of continuous internal surface 32A. Thus, in FIG. 5, embodiment surface 43 corresponds to internal surface 32A.

FIGS. 9 to 10 show a planar filter 48 having a dielectric substrate in the form of a plate 49 having resonant structures 50 connected by transmission lines 51 which have been formed by a layer of HTS material applied to broad surface 52. There is also shown a bottom layer 53 of HTS material forming a ground plane of filter 48. There is provided a plurality of capillary passages 54 in layer 53 in accordance with the invention, which may communicate with manifolds 60 and 61 shown in FIG. 10. Alternatively or additionally, plate 49 may also be provided with nanotube passages 55 (shown in phantom), which may also communicate with manifolds (not shown).

Figure 11:
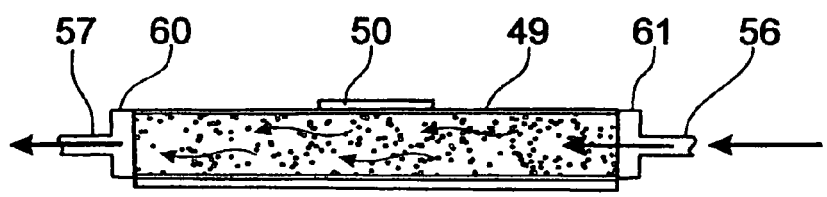
FIG. 11 is a section through the hollow body of the planar filter shown in FIG. 10.

In another embodiment shown in FIGS. 10 to 11, plate 49A may be provided which is made from a suitable permeable material such as ceramics material. In this arrangement and as best shown in FIG. 11, the gaseous refrigerant 61 may enter outlet 56 of manifold and diffuse through the permeable material of plate 49A before exiting through outlet 57 of manifold 60.

Figure 12:
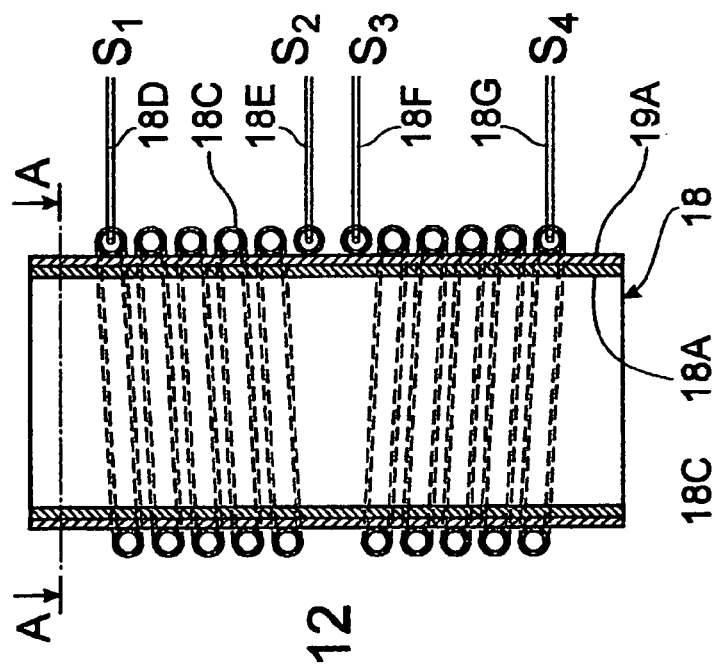
FIGS. 12–13 refer to another embodiment of the invention which refers to provision of cooling tubes for the compressor shown in FIG. 4.

In FIG. 12 reference is made to a compressor 18 which may be of any suitable type but preferably is a linear motor compressor as is well known in the art which is in the form of a cylinder and shown schematically in FIG. 12 having a cylindrical sheath of copper sheet 19A wound around a side wall 18A of the compressor.

There are also provided cooling tubes 18C formed of copper which are each connected to separate smaller cooling tubes 18D, 18E, 18F and 18G which are connected to separate or independent solenoid valves $S_1$, $S_2$, $S_3$ and $S_4$. Tube 18D is parallel with tube 18E and tube 18F is parallel with tube 18G.

Figure 14:
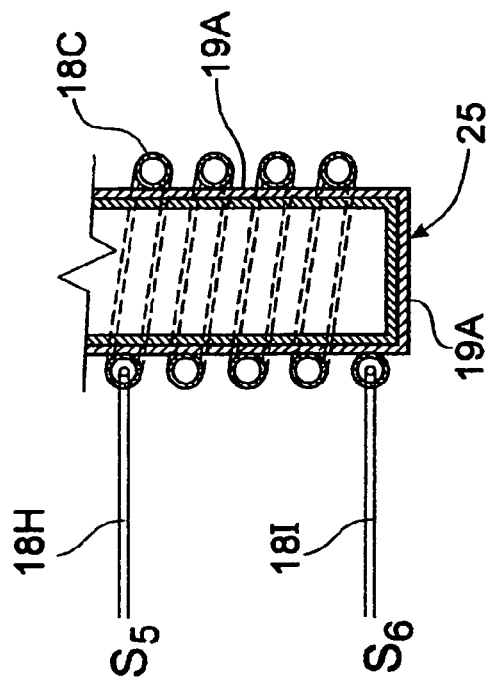
FIGS. 14–15 refer to another embodiment of the invention which refers to the provision of cooling tubes for the heat exchanger unit shown in FIG. 4.
Figure 15:
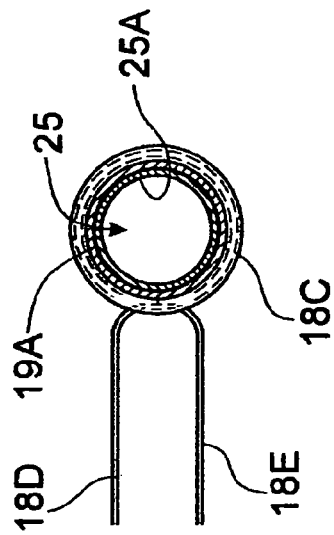
Figure 13:
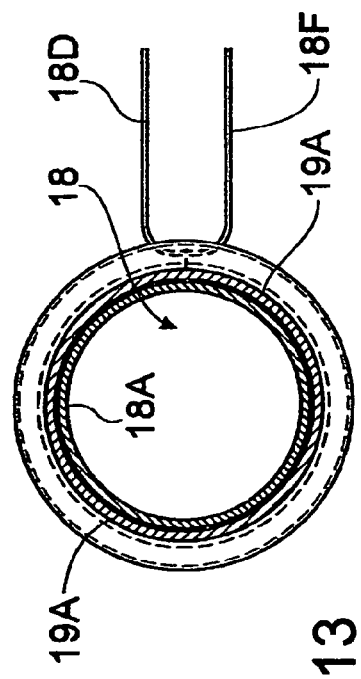

In FIGS. 14–15 reference is also made to another embodiment wherein cooling tubes are wound around heat exchanger unit 25 in similar manner as shown in FIGS. 12–13 wherein cooling tubes 18C are wound around heat exchanger unit 25 which may also be of cylindrical form having a continuous side wall 25A. Again tubes 18C form part of a copper sheet 19A wound around side wall 25A. There is also shown smaller cooling tubes 18I and 18H which each connect to separate or independent solenoid valves $S_5$ and $S_6$.

The purpose of cooling tubes 18C in each of the arrangements shown in FIGS. 12–13 and 14–15 respectively is to precisely control the amount of heat the heat exchanger unit or cold head 25 can deal with under different field operating ambient conditions and different microwave filter configurations. The cooling fluid of choice is carbon dioxide or other inert gases as described previously which is transported in cooling tubes 18C and actuation of passage of the gas is controlled via solenoid valves $S_1$–$S_4$ in FIGS. 12–14 and $S_5$–$S_6$ in FIGS. 14–15. The control signal to the solenoid valves is sent by a closed loop control system (not shown) which measures temperatures at the cold head 25, the external surface of compressor 18 and ambient room temperature. The control system then determines the frequency and quantity of cooling gas to be delivered to cooling tubes 18A to maintain the required temperature at the cold head and hence the temperature of microwave filter 28. In this regard the temperature of the HTS in filter 28 must be precisely controlled to maintain the connect frequency of operation for which they were designed and manufactured.

In another aspect of the invention, there is provided a refrigeration circuit incorporating a filter of the invention, as well as a cavity type filter having an internal layer of HTS material.

It also will be appreciated that a thin layer of gold of thickness 1–10 microns and more preferably 5 microns over the HTS material may preserve the HTS against contamination from the environment including moisture and vapour. This protects and preserves HTS performance and thus filter performance over time.

The invention claimed is:

1. A filter element having planar or cavity geometry having applied thereto a coating of temperature super conducting (HTS) material characterised in that said filter element or said coating of HTS material is provided with a porous structure or has associated therewith a plurality of cooling passages for passage of refrigerant when said filter element is connected to a refrigeration circuit.

2. A filter element as claimed in claim 1 having a planar geometry having one or more plates or layers of a dielectric substrate having a thickness of 0.3–2.0 mm wherein the coating of HTS material is applied in the form of transmission lines in the form of ribs or strips to one broad surface of the plate(s) or layer(s).

3. A filter element as claimed in claim 2 wherein the strips or ribs are applied to the dielectric substrate(s) to form transmission lines in the nature of a stripline, microstrip line or slotline.

4. A filter element as claimed in claim 2 wherein the HTS material is applied to the dielectric substrate(s) to form resonant structures interconnected by the transmission lines.

5. A filter element as claimed in claim 4 wherein the resonant structures are in the form of circles, rectangles or polygons.

6. A filter element as claimed in claim 1 having cavity geometry which comprises a waveguide cavity filter.

7. A filter element as claimed in claim 6 wherein the cavity filter is a body having a hollow interior and walls of minimal thickness between 0.01 and 5.0 mm.

8. A filter element as claimed in claim 7 wherein the hollow body has one or more partitions having apertures or passages forming resonant structures.

9. A filter element as claimed in claim 7 wherein the hollow body is a tube having a dielectric resonator formed co-axially within the tube.

10. A filter element as claimed in claim 7 wherein the cavity filter is formed of a solid block having passages or apertures machined or drilled out of the solid block.

11. A filter element as claimed in claim 6 wherein conducting layers of HTS material are applied to the hollow interior of the cavity filter.

12. A filter element as claimed in claim 1 wherein the HTS material is formed from YSZ, YBCO, TBCCO 2223, TBCCO 2212 and BSCCO 223.

13. A filter element as claimed in claim 12 wherein the HTS material is formed from YBCO.

14. A filter element as claimed claim 1 wherein the cooling passages having a diameter of 20 microns to 5 mm or nanotube capillary passages are formed in a body of the filter element.

15. A filter element as claimed in claim 14 wherein the body comprises dielectric plate(s) of a filter having planar geometry.

16. A filter element as claimed in claim 14 wherein the body is a tube or block having said cooling passages or said nanotube capillary passages.

17. A filter element as claimed in claim 16 wherein the body is formed from permeable material having internal interstices and the refrigerant passes through the interstices of the permeable material.

18. A filter as claimed in claim 1 wherein the cooling passages are formed from serpentine tubing formed from copper or other suitable conducting material having a diameter of 20 microns to 5 mm which are applied to a body of the filter element.

19. A filter as claimed in claim 1 wherein said cooling passages are formed in the HTS coating.

20. A filter as claimed in claim 19 wherein said cooling passages have a diameter of from 20 microns to 5 mm or are formed by nanotube capillary passages.

21. A refrigeration circuit incorporating a filter as claimed in claim 1.

22. A refrigeration circuit as claimed in claim 21 having a compressor connected to a heat exchanger assembly located in an evacuated housing wherein the heat exchanger assembly comprises an influent line, a first heat exchanger unit in communication with the influent line, a throttle valve which is in communication with the filter, a second heat exchanger unit in communication with the filter and a return line to the compressor.

23. A refrigeration circuit as claimed in claim 22 wherein cooling passages are attached to a side wall of the compressor.

24. A refrigeration circuit as claimed in claim 22 wherein cooling passages are attached to a side wall of the second heat exchanger unit.

* * * * *